United States Patent [19]

Jones

[11] 4,113,826
[45] Sep. 12, 1978

[54] FLUID FLOW CONTROL VALVES

[75] Inventor: Alan Philip Jones, Cwmbran Gwent, Wales

[73] Assignee: Saunders Valve Company Limited, Gwent, Wales

[21] Appl. No.: 761,900

[22] Filed: Jan. 24, 1977

[30] Foreign Application Priority Data

Feb. 25, 1976 [GB] United Kingdom ............... 7504/76

[51] Int. Cl.² ..................................... B29F 1/00
[52] U.S. Cl. ..................................... 264/269; 264/328
[58] Field of Search ............... 264/132, 328, 329, 267, 264/269, 259; 137/375

[56] References Cited

U.S. PATENT DOCUMENTS

| 2,411,398 | 11/1946 | Wallace | 264/269 |
| 2,601,700 | 7/1952 | Pinsky et al. | 264/132 |
| 3,376,014 | 4/1968 | Buckley et al. | 137/375 |
| 3,407,838 | 10/1968 | Boteler | 264/269 |
| 3,520,026 | 7/1970 | Stidham et al. | 264/329 |
| 3,776,989 | 12/1973 | Annis et al. | 264/329 |

FOREIGN PATENT DOCUMENTS 1,260,802  1/1962  United Kingdom ............... 137/375

Primary Examiner—Willard E. Hoag
Attorney, Agent, or Firm—Scrivener, Parker, Scrivener, & Clarke

[57] ABSTRACT

A method of forming an injection moulded lining on a valve body comprises the step of defining a cavity having a main portion which when filled with lining material forms the desired lining, and an extension portion continuous with an edge of the main portion. Lining material is injected into the extension portion until the cavity is filled. Any sprues produced by the injection are on the tab formed by the material in the extension portion and not on the lining proper. Thus, there is no danger of damaging the lining as sprues are removed, and they do not cause local stress in the lining.

6 Claims, 7 Drawing Figures

FLUID FLOW CONTROL VALVES

The invention relates to fluid flow control valves, and more particularly to fluid flow control valves provided with an injection moulded lining.

It has been proposed to provide a metal valve body with an injection moulded lining of thermoplastic material by inserting flow passage defining mandrels into the valve body and injecting plasticized thermoplastic material into the cavity defined between the mandrels and the body through gates formed in the mandrels. This technique has not proved entirely satisfactory since the gates through which the thermoplastic material is injected open on to a "functional" surface of the lining, i.e. either on to a surface which, when the valve is in use, is exposed to the fluid flowing through the valve, or on to a surface which seals against another surface in use of the valve. As a result, there is a risk that a functional surface of the lining will be damaged as the sprues part from the lining as the mandrels are removed, and any sprue left on the lining must be removed as an ancillary operation after the mandrels have been removed. The removal of the sprues is time consuming and may itself lead to damage to the lining.

In order to overcome the above problems it has been proposed to inject the plasticized thermoplastic material through a gate in the valve body, whereby the gate opens on to the surface of the lining which contacts the valve body rather than on to a functional surface of the lining. This avoids the problems associated with gates opening on to functional surfaces of the lining, but means that at least one gate must be cast or machined in the valve body. This adds to the cost of the valve body and provides a leakage passage for the fluid passing through the valve should the lining be ruptured. Since lined valves are often used when the fluid to be controlled is highly corrosive, the presence of this leakage passage is highly undesirable. Further, since the sprue remaining in the gate prevents relative movement of the lining and the valve body near the gate, local stresses in the region of the gate may be set up in the lining, for example as a result of moulding stresses or differential thermal expansion of the lining and the body.

Both of the above methods suffer from the further disadvantage that plasticized thermoplastic must pass through an intermediate flow passage, in the mandrel or in the valve body, between the hot runner nozzle of the injection machine and the cavity to be filled. This can produce difficulties in complete cavity filling and moulding flaws may result.

According to the present invention there is provided a method of forming an injection moulded lining on a valve body comprising the steps of assembling the valve body with mould members to define a cavity, the cavity comprising a lining portion which when filled with injected material forms the desired lining, and an extension portion continuous with the lining portion and extending outwardly from an edge of the lining portion; and injecting a lining material into the extension portion of the cavity until at least the lining portion of the cavity is filled with lining material.

Thus, the desired lining is formed by injecting lining material into an extension cavity portion continuous with the cavity portion which defines the desired lining. In general, injection is continued until the entire cavity is filled with injected material, whereby a body of injected material is formed which comprises the desired lining and an extension portion integral with the desired lining and extending outwardly from an edge thereof. Any sprues on the injected material are on the extension portion and do not affect the desired lining in any way. If desired, the extension portion can be severed from the desired lining. Any such severance is along an edge of the lining, and thus does not damage the major surfaces of the lining in any way.

Where the valve body is a diaphragm valve body the lining preferably extends over the diaphragm clamping flange of the valve body, and the extension portion is continuous with the outer edge of the lining on the clamping flange. In this case the extension portion may be so shaped to produce a tab which extends outwardly of the clamping flange of the lined body and which may carry indicia identifying the material of the lining.

The invention will be better understood from the following description of a preferred embodiment thereof, given by way of example only, reference being had to the accompanying drawings, wherein:

FIGS. 1 and 2 show respectively an axial part section and a plan of a valve body to be lined;

FIGS. 3 and 4 correspond to FIGS. 1 and 2 and show the valve body after lining;

Figure 1:
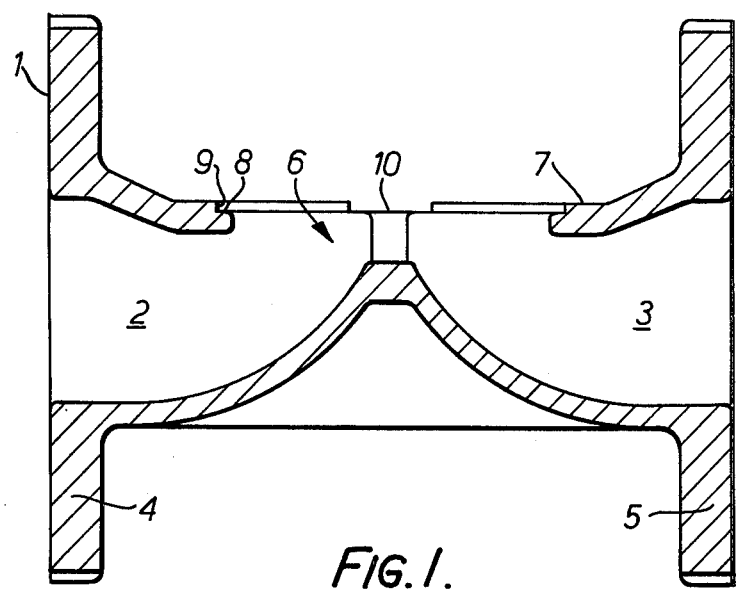
Figure 2:
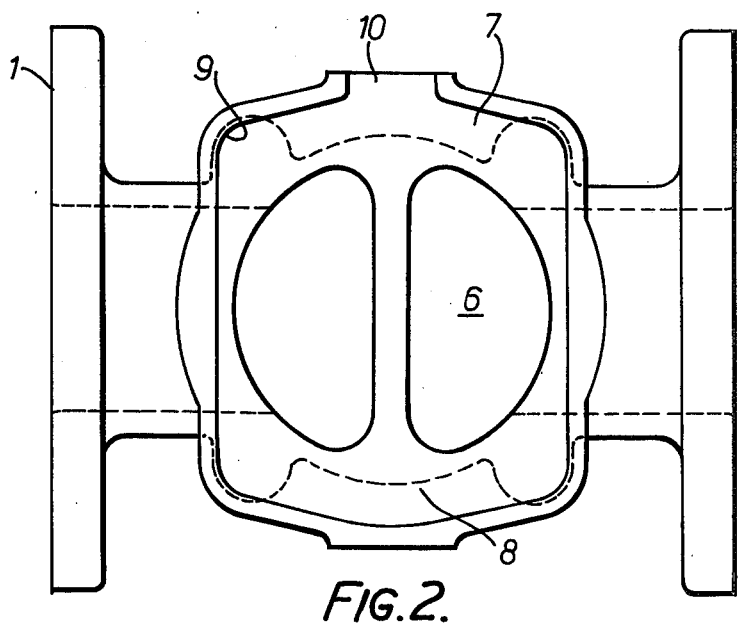

Referring to the drawings, there is shown a diaphragm valve body 1, for example of cast iron. The body includes flow passages 2, 3, end flanges 4, 5, and a diaphragm opening 6. The diaphragm opening 6 is surrounded by a clamping flange 7 to which a diaphragm is clamped in use. The clamping flange 7 is provided with a recessed portion 8 bounded by a peripheral shoulder 9. The shoulder 9 extends around the entire periphery of the recessed portion, save for a gap 10 at one side of the clamping flange.

Figure 3:
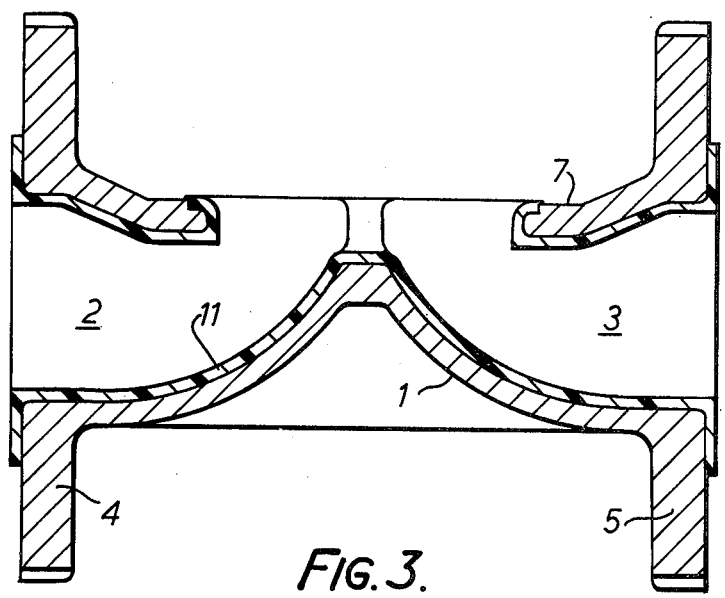
Figure 4:
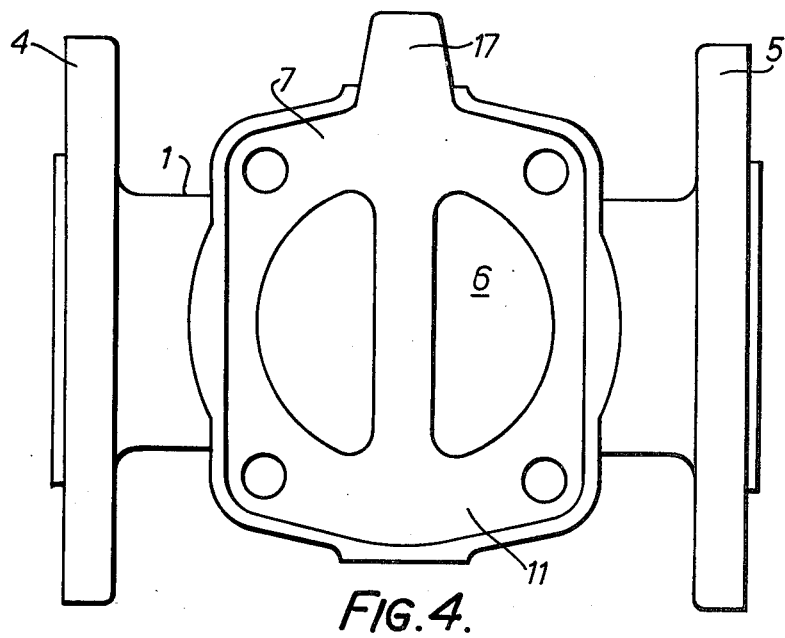

As shown in FIGS. 3 and 4 the valve body 1 is provided with an injection moulded lining 11 of a thermoplastic material, e.g. polypropylene. The lining covers all the surfaces of the valve body which would otherwise be exposed to the fluid passing through the valve. The lining extends to partially cover the end flanges 4, 5, and completely covers the recessed portion 8 of clamping flange 7 to such a depth that the upper surface of the lining on the clamping flange is slightly proud of the surrounding metal. The surfaces of the lining exposed to the flow passages 2, 3, the axially outwardly facing surfaces of the lining on the end flanges 4, 5 and the upper surface of the lining on the clamping flange 7 may be classified as "functional" surfaces since they are either exposed to fluid passing through the valve, or seal against other surfaces when the valve is in use.

Figure 5:
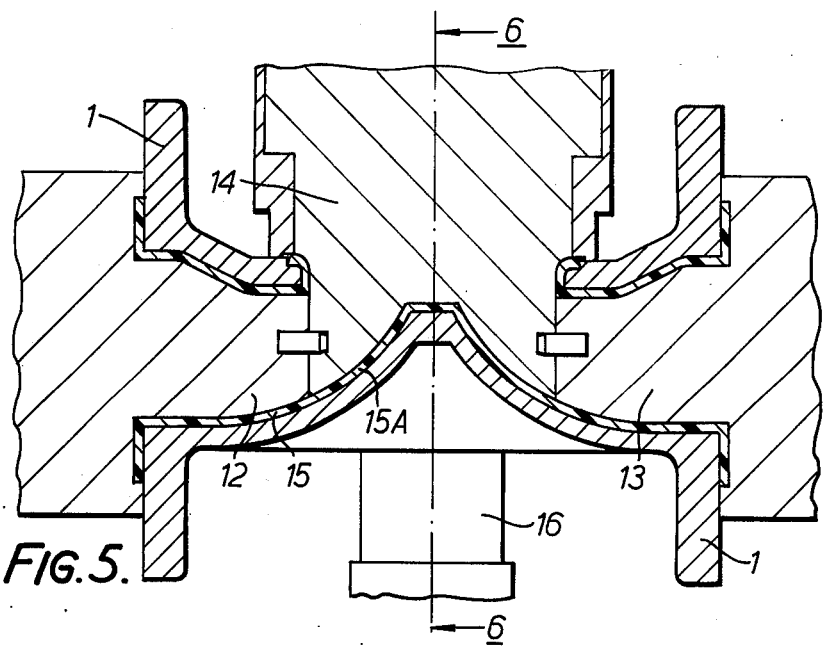
FIG. 5 is an axial part section of the valve body during lining.
Figure 6:
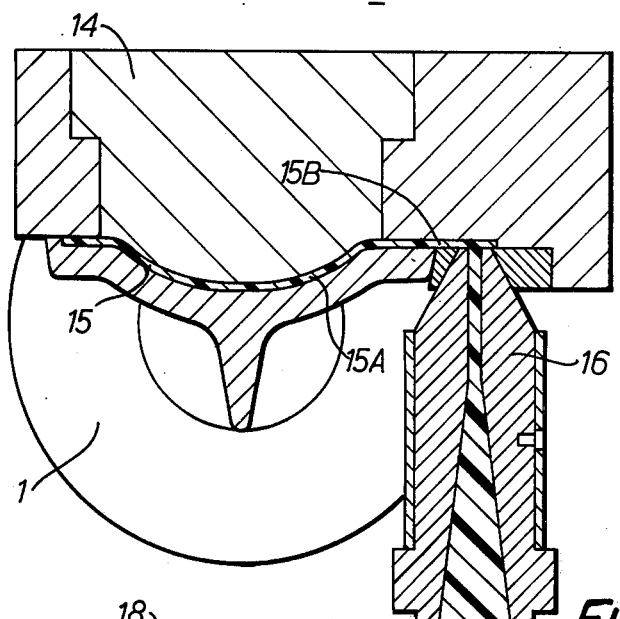
FIG. 6 is a view on the line 6—6 of FIG. 5.

Referring to FIGS. 5 and 6, the lining 11 is formed by assembling the valve body 1 with mould members comprising mandrels 12, 13 and core tool 14 to define a cavity 15 which is filled with thermoplastic material from a hot runner nozzle 16. The cavity 15 comprises a liner portion 15A defined between the mould members and the valve body which, when filled with injected material, forms the lining on the valve body, and an extension portion 15B continuous with the lining portion 15A and extending outwardly from the edge of the lining portion in the region of the gap 10 in the shoulder 9. When filled with injected material the extension portion 15B forms a tab 17 integral with the lining and extending outwardly of the clamping flange 7 (FIG. 4).

The tab 17 may carry indicia identifying, for example, the material of the lining.

It will be noticed that the cavity is filled through the extension portion of the cavity whereby no sprue joins the lining on a functional surface thereof, and no gates are needed in the valve body. Further, the arrangement enables plasticized thermoplastic material to be injected direct from the hot runner nozzle of the injection moulding machine into the cavity.

It will be appreciated from FIG. 6 that whilst in the embodiment shown a single valve body is lined per injection, a second valve body could be arranged to the right of the body 1 (as viewed in FIG. 6) set up similarly to the body 1 with the extension portion of the cavity of the second body continuous with the extension portion 15B. This would enable two bodies to be lined with a single injection from the hot run nozzle 16.

Figure 7:
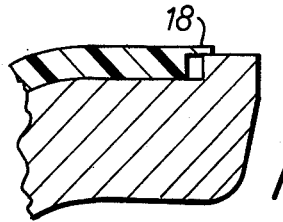
FIG. 7 is a detail of the lining.

Advantageously, the portions of the core tool which define the top surface of the lining on the clamping flange are so shaped that the lining on the clamping flange is slightly proud of the surrounding metal, and extends outwardly slightly beyond the shoulder 9. If this is done a lip 18, FIG. 7, is formed which ensures that no undesired exposed gap develops between the lining and the shoulder 9 if the lining shrinks slightly. The fact that the lining is slightly proud of the surrounding metal also ensures that the diaphragm seals against the lining and not against the metal of the flange.

What is claimed is:

1. A method of forming an injection moulded lining on a valve body, said valve body having a flow passage and a pair of end flanges, said method comprising:
    (1) assembling the valve body with mould members to define a cavity, the cavity comprising:
        (a) a desired lining portion which when filled with injected material defines a desired lining extending over the entire surface of said flow passage and over at least part of the surface of each said end flange; and
        (b) an extension portion continuous with the desired lining portion and extending outwardly from an edge of the desired lining portion, the extension portion when filled with injected material forming a tab which extends from and is integral with the desired lining;
    (2) injecting a lining material into the extension portion of the cavity until the cavity is filled with lining material; and
    (3) stripping the valve body complete with the desired lining and the tab from the mould members whilst maintaining the tab integral with the desired lining.

2. A method according to claim 1 wherein the lining material is injected by an injection moulding machine and the hot runner nozzle of the injection moulding machine injects lining material directly into the extension portion of the cavity.

3. A method according to claim 1 wherein the injected material is polypropylene.

4. A method according to claim 1 wherein the valve body is a diaphragm valve body having a clamping flange with a recessed inner portion bounded by a peripheral shoulder, and the mould members are shaped such that the desired lining is proud of the shoulder and extends outwardly beyond the shoulder.

5. A method according to claim 1 wherein the extension portion extends away fro the valve body in such a manner that the tab is spaced from the valve body.

6. A method according to claim 3 wherein the mould members are provided with indicia forming means for producing identifying indicia on the tab.

* * * * *